Sept. 5, 1950      J. A. PELLETTERE      2,521,477
APPARATUS FOR MEASURING LIQUID CONTENT
Filed Jan. 26, 1948      2 Sheets-Sheet 1
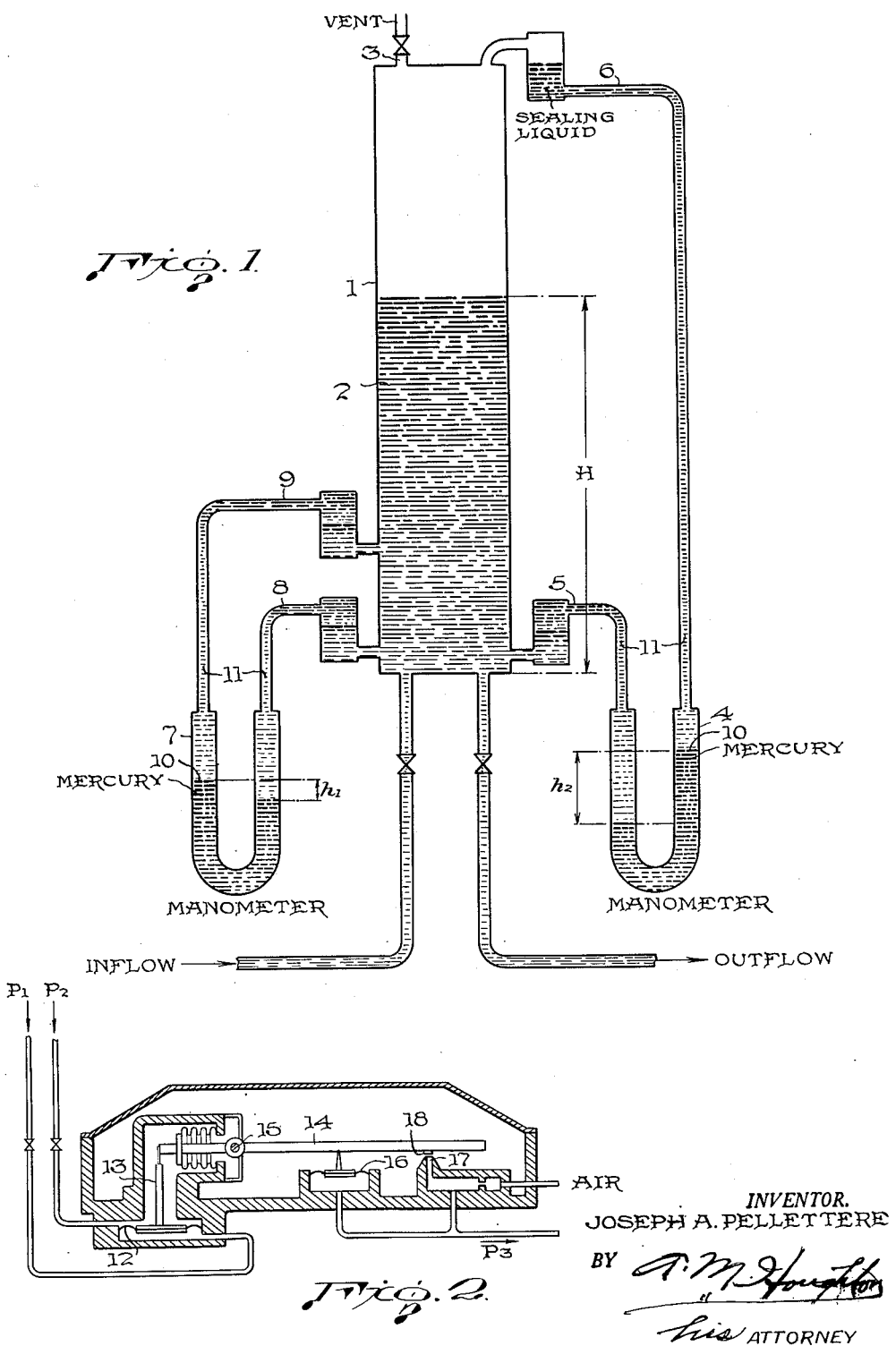
INVENTOR.
JOSEPH A. PELLETTERE

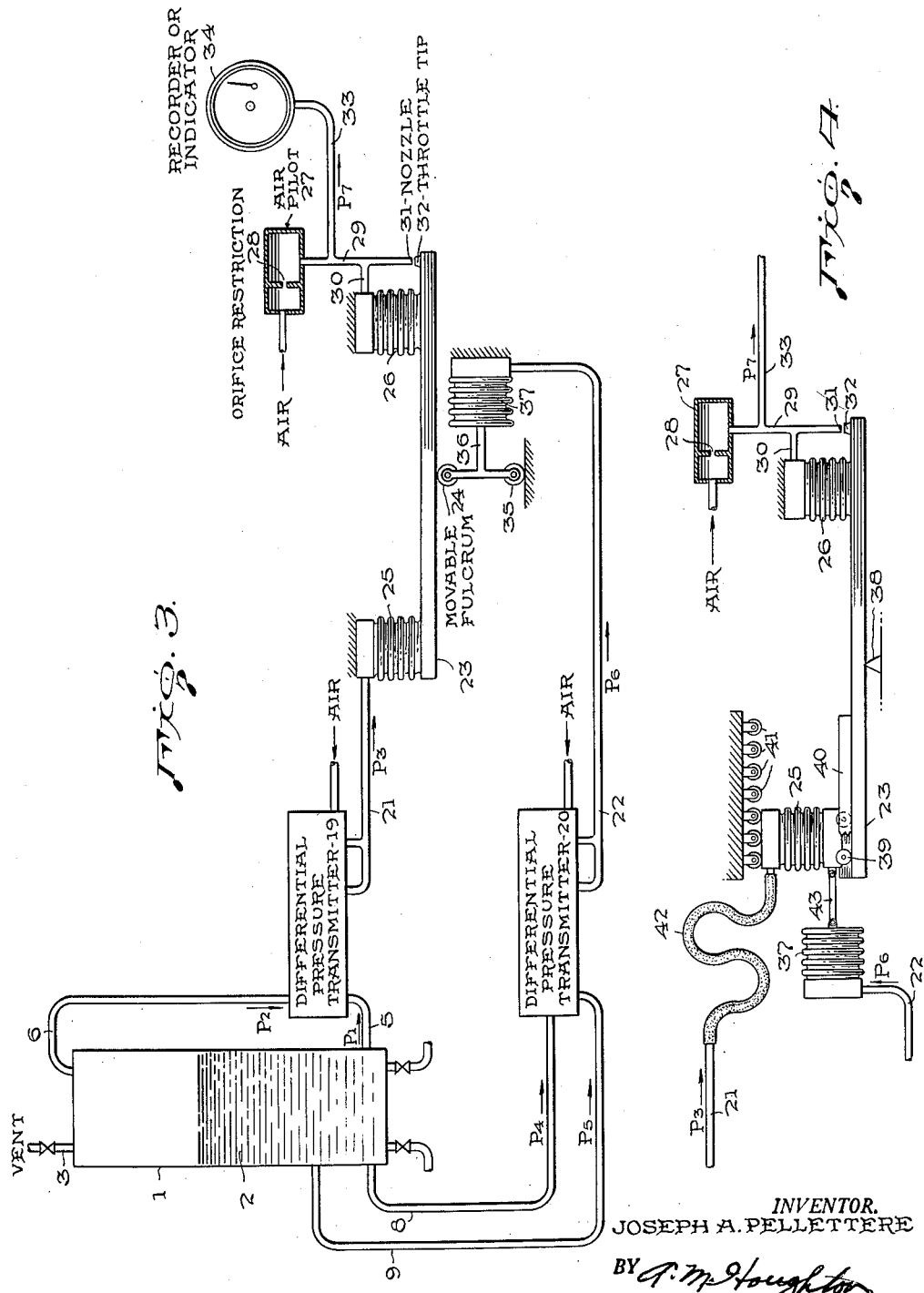

Patented Sept. 5, 1950

2,521,477

UNITED STATES PATENT OFFICE 2,521,477

APPARATUS FOR MEASURING LIQUID CONTENT

Joseph A. Pellettere, Pittsburgh, Pa., assignor to Gulf Oil Corporation, Pittsburgh, Pa., a corporation of Pennsylvania Application January 26, 1948, Serial No. 4,407

8 Claims. (Cl. 73—299)

This invention relates to apparatus for measuring liquid content which will indicate the content of a liquid in a vessel irrespective of its density. More particularly it relates to a gage which will correct for variations in density and communicate the resultant measurement to a point remote from the vessel containing the liquid.

This apparatus makes use of the familiar principle of measuring the content of liquid in a vessel by measuring its hydrostatic pressure at a low point in the vessel, and my invention involves an automatic means of correcting the hydrostatic pressure measurement in proportion to any variations of density of the liquid being measured.

Accordingly, an object accomplished by my invention is the provision of a gage which is capable of measuring a differential pressure resulting from the hydrostatic head of a liquid in a vessel and compensating that differential pressure for density variations.

A further object accomplished by my invention is the provision of a device of the character described capable of communicating the liquid content to a point removed from the vessel containing the liquid to be measured, such as in a central control station.

A still further object accomplished by my invention is the provision of a gage of the character described which may be used to give a continuous indication of liquid content in a vessel.

Another object accomplished by my invention is the provision of a gage which will give an accurate indication of liquid content within practical limits regardless of ordinary changes in the pressure thereabove and variation in density of the liquid resulting from changes in its temperature.

Still another object accomplished by my invention is the provision of a gage of the character described having practical design and operational features incorporated therein to give the ruggedness required of a gage in such applications as may be had in a petroleum refinery or other manufacturing plant.

Other objects appear hereinafter.

Many different types of liquid level gages have been used in the art. They may be roughly classified according to their operational features, namely, the float type, the hydrostatic or differential pressure type, the differential temperature type, and those employing electrical methods, such as may be used to determine the level of electrolytes. The use of the float type often leads to mechanical difficulties, especially when operated over long periods of time. The differential temperature type and those employing electrical methods of measurement exclusively are, generally speaking, used for rather specific purposes. The differential pressure or hydrostatic type gage finds wide application in the art, but in many instances the accuracy of such a gage is seriously impaired by changes in the density of the liquid to be measured. These density changes may be due to fluctuations in the temperature of the liquid or may result from use of the vessel for totally different liquids from time to time, as changing from water to naphtha, or from a hydrocarbon of one density to a hydrocarbon of a different density. To successfully meet this problem with a practical solution is the primary purpose of my invention.

In the oil industry, one may find many applications of liquid level gages. It is desirable to know at all times the level of liquid contained in the many tanks and reaction vessels used by the industry. For example, the level of oil in the numerous tanks of a tank field is always important. In addition, the level of hydrocarbon material undergoing transformation in a refinery operation, such as in a catalytic cracking unit, is vitally important to those controlling the operation. In the latter case, the level is sometimes calculated from the readings of two instruments, one indicating the total head of fluid and the other indicating the density of said fluid. These readings are as a rule transmitted to a central gaging or control station where a number of refinery operations may be instrumentally observed. Pneumatic telemetering systems are widely used to transmit this information where the distances involved are within its limitations and where the avoidance of the hazards of electrical systems or the cost of explosion proofing is important. These systems employ pneumatic pressure transmitters to produce air pressures proportional to the measured variables, and pressure-sensitive indicators or recorders to convert the transmitted information into a dial indication or onto a chart. The distance between pressure transmitter and receiver may be 1,000 feet or more, the two instruments ordinarily being connected by $3/16$ to $5/16$ in. bore copper tubing.

This invention is particularly advantageous when applied to measuring liquid level or liquid content in petroleum refinery operations because it employs the relatively high force of a pneumatic telemetering system in performing its function. However, it may also be advantageously used in other applications where liquid level or liquid content determinations are important.

Another important advantage of the invention lies in its ability to automatically compensate a liquid level indication for density changes due to the various factors affecting density.

A further advantage is that the liquid level gage of the present invention is designed to give a continuous indication of liquid level at all times.

Other advantages lie in the novel construction and arrangement of parts as hereinafter shown.

Fig. 1 is a schematic diagram illustrating some of the principles upon which the present invention is based.

Fig. 2 is a sectional view illustrating a conventional pneumatic differential pressure transmitter which may be used with the present invention as elements 19 and 20 of Fig. 3.

Fig. 3 shows an apparatus schematically illustrating one embodiment of my invention.

Fig. 4 is a schematic view exemplifying another embodiment of my invention.

The application of the differential pressure method of measuring liquid level and liquid content is illustrated in Fig. 1 wherein 1 represents a tank or vessel containing a liquid 2 of height H. The vessel may or may not be provided with a vent 3 to the atmosphere. A manometer 4 is connected across the head of fluid by line 5 running to the lowermost side of vessel 1 and line 6 running to a point at all times above the liquid in the vessel. Another manometer 7 is connected by means of lines 8 and 9 across an appropriate increment of height of the vessel, say 1 foot, at a region which will at all times be covered by the liquid 2 in vessel 1. Both manometers contain mercury 10 which will indicate by distances $h_1$ and $h_2$ between the menisci the pressure differentials acting on the manometers. Each manometer may or may not contain a sealing liquid 11, depending upon the physical and chemical nature of the liquid 2 in the vessel. If no sealing liquid is used, the liquid 2 will of course fill the connecting lines and manometer arms to the points of intersection with the mercury. Differential $h_2$ measured by manometer 4 is proportional to the height H of fluid 2 in the vessel as long as the density of such fluid remains constant. However, a change in density of the fluid 2 will cause a corresponding change in the constant of proportionality, and an inaccurate indication of liquid level will result. The differential $h_1$ measured by manometer 7 is proportional to the density of fluid within the vessel at all times, if this manometer is connected for instance across the lowest 12 in. of vessel 1, such that liquid will always be over these connections. Then, if the head indicated by manometer 4 is divided by the head indicated on manometer 7, the result is feet of fluid contained by vessel 1. The desirability of obtaining a liquid level indication, corrected for density changes, without having to perform this calculation is apparent. My invention ties the two differential pressure indications together in such a manner that this result is accomplished.

The first step is to convert the hydrostatic pressures which have been seen to operate manometers 4 and 7 into pneumatic pressures proportional thereto. This may be accomplished by using any of the well known devices commercially available or disclosed by the art for such a purpose. For example, manometers 4 and 7 may be replaced by a differential diaphragm type device or a differential bellows type device. These instruments are usually termed "differential pressure transmitters" by the art. One such device is a differential pressure transmitter shown in section in Fig. 2. This device operates on the force balance principle, that is, the instrument is of the null balance type and an auxiliary force is employed to bring a beam to balance. The amount of force required to effect the balance is used as the measure of the load. The differential pressure which is to be measured is exerted across a differential diaphragm 12. The force produced is transmitted to reaction diaphragm 16 through a pushrod 13 and weighbeam 14, pivoted at point 15. Compressed air, or other gas under pressure, is admitted through an orifice and bleeds from nozzle 17, being restricted in its flow by throttle tip 18, which is mounted on weighbeam 14. The back pressure on the nozzle is conducted to reaction diaphragm 16. Any motion of throttle tip 18 will therefore produce variations in pressure in reaction diaphragm 16, directly proportional to the changes in force produced by diaphragm 12. If the force developed by the pressure on diaphragm 16 multiplied by its lever arm to point 15 is not sufficient to counteract that produced by diaphragm 12 multiplied by its lever arm to point 15, throttle tip 18 will approach nozzle 17 until the pressure builds up to the point where these forces are balanced. Conversely, too large a force developed by diaphragm 16 will cause the throttle tip to withdraw from the nozzle slightly and reduce the pressure on diaphragm 16. The result is that the throttle tip is held at just the distance from the nozzle which will cause a stable balance of forces, and the pressure on the lower side of diaphragm 16 or the back pressure of nozzle 17 may be used as a direct measure of the differential pressure across diaphragm 12.

Two of the above described pressure transmitters or other appropriate instruments are used in the present invention. Referring to Fig. 3, it may be seen that one differential pressure transmitter 19 is connected by lines 5 and 6 across vessel 1 to convert the pressure differential $P_1$—$P_2$ produced by the entire quantity of liquid 2 in vessel 1 into a pressure $P_3$ proportional thereto. The other differential pressure transmitter 20 is connected by lines 8 and 9 across a low region of vessel 1 to convert the differential pressure $P_4$—$P_5$, which is a function of the density of the liquid 2, into a pressure $P_6$ proportional thereto. These pressures $P_3$ and $P_6$ are transmitted by means of lines 21 and 22 respectively to a device utilizing the force balance principle to produce a pressure $P_7$ which is proportional to the height of liquid in vessel 1 at all times, notwithstanding density changes of said liquid. This device for producing resultant pressure $P_7$ from pressures $P_3$ and $P_6$ is as follows. A beam 23 is fulcrumed by a movable fulcrum 24, such that the beam may be deflected by forces acting on either side of the fulcrum. One force results from the pressure exerted by a hydron or bellows 25, one end of which is fixed and immovable while the other is attached to an end of beam 23. This bellows 25 is energized by the pressure $P_3$ from line 21 to which bellows 25 is connected. Another force acting on beam 23 results from the pressure exerted by hydron or bellows 26, one end of which is also fixed and immovable while the other is attached to a point on beam 23 so as to position bellows 25 and 26 on opposite sides of fulcrum 24. The bellows 26 is energized by means of a pneumatic pressure such as air supplied from an external source to a pilot device 27 having a restriction orifice 28 disposed therein, and from thence through lines 29 and 30 to bellows 26 to which line 30 is connected. The pressure in bellows 26 is controlled by means of a nozzle 31 located on the end of line 29 from which air is permitted to discharge and a throttle tip 32 mounted on beam 23 so as to be in close proximity to the discharge opening of nozzle 31. The back pressure in line 29, which is, incidentally, the resultant pressure $P_7$ produced by the balance, is transmitted by means of line 33 to a recording and/or indicating instrument 34. Many of the commercially available recorders and indicators adapted either to record or indicate by means of a pointer, are suitable for use with this device. Movable fulcrum 24 may be a roller bearing or may be comprised of any suitable means exhibiting low frictional characteristics between itself and beam 23. Similar means such as a roller 35 may be connected to fulcrum 24 by a connecting element 36 to provide a support for the fulcrum. Fulcrum 24 is moved by means of another hydron or bellows 37, one end of which is fixed and immovable while the other is attached to connecting element 36. Bellows 37 is energized by means of pressure $P_6$ which is delivered thereto by means of connecting line 22. This bellows and those described above are commercially available devices which are designed to exhibit equal increments of deflection with equal increments of pressure applied internally.

The operation of the above described appartus is as follows. First it will be assumed that the density of the liquid 2 under measurement in vessel 1 is constant. In this case, pressure $P_3$ produced by differential pressure transmitter 19 will be directly proportional to the height of liquid in vessel 1. An increase in liquid level will then produce a corresponding increase in pressure $P_3$ tending to force the left lever arm of beam 23 downward. This raises the right lever arm of beam 23 which in turn brings throttle tip 32 in closer proximity to nozzle 31 and restricting the discharge of air therefrom. Due to this restriction, the pressure within line 29 will be increased, causing a similar increase in the pressure within bellows 26 which will exert sufficient force downward to restore beam 23 to a state of equilibrium. Practically speaking, the beam remains in continuous balance, the actual movement of the beam being very small, on the order of a few thousandths of an inch maximum. However, the back pressure in bellows 26 and line 29 will be higher than its original value in proportion to the increase in liquid level of vessel 1. This back pressure, represented by $P_7$ will register on recorder or indicator mechanisms 34. A decrease in liquid level will similarly cause equilibrium to be set up in the balance, and result in a proportional decrease in pressure $P_7$. Under operational conditions, however, the density of the liquid 2 under measurement will vary somewhat, causing pressure $P_6$ produced by differential pressure transmitter 20 to vary accordingly. An increase in liquid density causes a proportional increase in pressure $P_6$ which causes bellows 37 to expand, moving fulcrum 24 to the left. A new ratio of lever arms on the left and right ends of the beam 23 is thus set up, so that a given change in pressure $P_3$ will now require a smaller change in pressure $P_7$ to balance the forces acting on beam 23 and produce equilibrium. Thus the force balance automatically corrects for density changes, because if density increases, a given change of differential pressure ($P_1$—$P_2$) actually represents a smaller change of level than before. The reverse will of course be true for a decrease in density, and the fulcrum 24 would then move to the right.

A rigorous mathematical analysis will reveal the fact that equal increments of change of pressure $P_6$ (due to density variations) do not produce exactly equal increments of change in ratio of left lever arm to right lever arm, even though bellows 37 is designed to give equal increments of deflection with equal increments of pressure $P_6$ applied internally. However, as long as changes in density do not exceed reasonable limits, and the physical dimensions are judiciously chosen, the error will not exceed 1% or so, which is sufficiently accurate for most applications. Another embodiment of my invention which eliminates this small mathematical error is illustrated in Fig. 4. Here the fulcrum 38 is fixed, as opposed to movable fulcrum 24 of my previously described embodiment. Bellows 25 is made movable by means such as rollers 39 attached to the base thereof and adapted to maintain engagement with beam 23 by means of guide plates 40 attached to said beam. A series of fixed rollers 41 are provided to engage the top of bellows 25 so that a positive force may be exerted on the left lever arm of beam 23 whenever bellows 25 is energized. The same energizing force $P_3$ is supplied to bellows 25 by means of line 21, but a flexible line 42 is used to connect the bellows and line. This flexible line is sufficient in length to allow unrestricted movement of the bellows. The longitudinal movement of bellows 25 along beam 23 occurs as a result of the action of bellows 37 and interconnecting link 43 pivotally connected to both bellows 37 and bellows 25. Bellows 37 is energized by means of the pressure $P_6$ supplied to it from line 22, and consequently will expand and contract with changes in the density of liquid 2 under measurement. An increase in density will, by causing pressure $P_6$ to increase, cause bellows 37 to further expand, pushing bellows 25 along the beam to the right. Since the left lever arm is shortened thereby and the right lever arm remains constant, a given change in pressure $P_3$ will now require a smaller change in pressure $P_7$ to balance the forces acting on beam 23 and produce equilibrium. Thus again, it is seen that the force balance automatically compensates for density changes, because if density increases, a given change of differential pressure ($P_1$—$P_2$) actually represents a smaller change of level than before. The reverse will apply for a decrease in density, and bellows 25 would then move to the left.

Many modifications may be had of the above described embodiments without departing from the spirit and scope of the invention. For example, the beam 23 may be provided with stops or guides at its ends to prevent any longitudinal movement thereof when bellows 37 operates to move either the movable fulcrum 24 described in one embodiment or movable bellows 25 described in the other. In addition, the embodiment shown in Fig. 4 may be modified by making bellows 25 fixed as in Fig. 3, and adapting bellows 26 for movement along beam 23. An arrangement similar to that employed for movable bellows 25 of Fig. 4 may be employed for this purpose, and a flexible connection interposed in line 30. Bellows 37 would then be situated so as to control the longitudinal movement of bellows 26.

Many equivalents may be used without affecting the scope of my invention. The use of various commercially available differential pressure transmitters as well as recorders and indicators has been previously referred to. Other elements such as those of the flexible diaphragm type, or in fact any pressure responsive device capable of exerting a mechanical force, may be substituted for the hydron bellows 25, 26 and 37 of the force balance by making certain modifications within the knowledge of those skilled in the art.

Furthermore, the illustrations described herein are intended to be schematic, and are not intended to operate in any way as limiting the constructional features thereof.

By the phrase "differential pressure transmitter" as used in the specification and in the appended claims, I mean any device which is adapted to receive two different pressures and convert the differential pressure therebetween into a single output pressure proportional thereto.

In the appended claims, when I speak of a fixed head of liquid I mean thereby a head of fixed and unvarying height, the specific height being of no importance but the lack of variation in height being essential.

When I speak in the appended claims of a means for measuring and exhibiting the degree of a balancing force or pressure in equivalent unit of liquid content in the vessel, I mean a device calibrated in any units expressing liquid content, whether it be by volume, weight or height of fluid, or any other units from which an indication of liquid content may be obtained.

What I claim is:

1. A device for determining the liquid content in a vessel, irrespective of the density of the said liquid, which comprises a differential pressure transmitter adapted to convert differential pressure into a pneumatic pressure proportional thereto; a conduit leading from a low point below the liquid level in the vessel containing the liquid to be measured to the high pressure side of said differential pressure transmitter; a conduit leading from a high point above the liquid level in said vessel to the low pressure side of said differential pressure transmitter; a second differential pressure transmitter adapted to convert differential pressure into a pneumatic pressure proportional thereto; a conduit leading from a low point below the liquid level in said vessel to the low pressure side of the said second differential pressure transmitter; a conduit leading from a point in said vessel lower than the last aforesaid point, to the high pressure side of the said second differential pressure transmitter; a force balance beam and a fulcrum therefor; a pneumatically operated means in communication with the first mentioned differential pressure transmitter and adapted to exert the pneumatic pressure of this first mentioned differential pressure transmitter on one arm of the force balance beam; a pneumatically operated means for exerting on the opposite arm of the force balance beam a force to balance that exerted on the first mentioned arm thereof; means adapted to measure the said balancing force and to exhibit the degree of this force in equivalent units of liquid content in said vessel; and means in communication with the pneumatic pressure of the said second differential pressure transmitter and operable thereby and adapted to vary the ratio of the lever arms of the force balance beam in proportion to the pneumatic pressure.

2. A device for determining the liquid content in a vessel, irrespective of the density of the said liquid, which comprises a differential pressure transmitter adapted to convert differential pressure into a pneumatic pressure proportional thereto; a conduit leading from a low point below the liquid level in the vessel containing the liquid to be measured to the high pressure side of said differential pressure transmitter; an open connection from the atmosphere to the low pressure side of said differential pressure transmitter; a second differential pressure transmitter adapted to convert differential pressure into a pneumatic pressure proportional thereto; a conduit leading from a low point below the liquid level in said vessel to the low pressure side of the said second differential pressure transmitter; a conduit leading from a point in said vessel lower than the last aforesaid point, to the high pressure side of the said second differential pressure transmitter; a force balance beam and a fulcrum therefor, a penumatically operated means in communication with the first mentioned differential pressure transmitter and adapted to exert the pneumatic pressure of this first mentioned differential pressure transmitter on one arm of the force balance beam; a pneumatically operated means for exerting on the opposite arm of the force balance beam a force to balance that exerted on the first mentioned arm thereof, and a means adapted to measure this balancing force and to exhibit the degree of this force in equivalent units of liquid content in said vessel; and pneumatically actuated means in communication with the pneumatic pressure of the said second differential pressure transmitter adapted to vary the ratio of the lengths of the two arms of the force balance beam in proportion to the variation of density of the liquid undergoing measurement.

3. A device for determining the liquid content in a vessel, irrespective of the density of the said liquid, which comprises a differential pressure transmitter adapted to convert differential pressure into pneumatic pressure proportional thereto and having a high pressure connection and a low pressure connection for the actuating pressures and having a pneumatic pressure connection for the converted force; a conduit leading from a low point below the liquid level in the vessel containing the liquid to be measured to the high pressure connection of the said differential pressure transmitter; a conduit leading from a high point above the liquid level in the said vessel to the low pressure connection of said differential pressure transmitter; a second differential pressure transmitter adapted to convert differential pressure into pneumatic pressure proportional thereto and having a high pressure connection and a low pressure connection for the actuating pressures and having a pneumatic pressure connection for the converted force; a conduit leading from a low point below the liquid level in said vessel to the low pressure connection of the said second differential pressure transmitter; a conduit leading from a point in said vessel lower than the last aforesaid point, to the high pressure connection of the said second differential pressure connection; a force balance beam and a fulcrum therefor; a pneumatically operated means in connection with the pneumatic pressure connection of the first mentioned differential pressure transmitter and adapted to exert the pneumatic pressure of the first mentioned differential pressure transmitter on one arm of the force balance beam; a pneumatically operated means for exerting on the opposite arm of the force balance beam a force to balance that exerted on the first mentioned arm thereof, and a means adapted to measure this balancing force and to exhibit the degree of this force in equivalent units of liquid content in said vessel; and pneumatically actuated means in communication with the pneumatic pressure connection of the said second differential pressure transmitter, adapted to vary the ratio of the lengths of the two arms of the force balance beam in proportion to the pneumatic pressure applied.

4. In a device for measuring the liquid content in a vessel by determining the static head thereof, the improvement to compensate for variation of density of the liquid being measured, which comprises a force-balance beam, a fulcrum therefor, means for imposing on one end of the force-balance beam a force proportional to the static head of the liquid to be measured, means for imposing a balancing force on the opposite end of the force balance beam and means for measuring this force and exhibiting the degree thereof in equivalent units of liquid content in said vessel, means responsive to the pressure differential through a fixed head of liquid below the liquid level in the vessel for varying the proportion between the two arms of the force balance beam.

5. An apparatus for determining the content of liquid in a vessel which apparatus comprises a force balance beam and a fulcrum therefor, a means for communicating the static head of the liquid in the vessel to one arm of the force balance beam, a means for exerting a balancing force on the other arm of the force balance beam, means for measuring the last-mentioned force and for exhibiting the degree of this force in equivalent units of liquid content in said vessel, means responsive to the pressure differential through a fixed head of liquid below the liquid level in the vessel for varying the proportion between the two arms of the force balance beam.

6. An apparatus for determining the content of liquid in a vessel which comprises a force-balance beam and a fulcrum therefor, pressure responsive means for communicating a force proportional to the static head of the liquid to one arm of the force balance beam, a second pressure responsive means for exerting a balancing force on the other arm of the force balance beam, a means for measuring the last-mentioned force and for exhibiting the degree of this force in equivalent units of liquid content in said vessel, means responsive to the pressure differential through a fixed head of liquid below the liquid level in the vessel and a third pressure responsive means operatively controlled thereby for varying the proportion between the two arms of the force balance beam.

7. An apparatus for determining the content of liquid in a vessel which comprises a force balance beam and a movable fulcrum therefor, a bellows for communicating a pneumatic pressure proportional to the static head of the liquid in the vessel to one arm of the force balance beam, a second bellows for exerting a pneumatic balancing pressure on the other arm of the force balance beam, means for measuring said pneumatic balancing pressure and for exhibiting the degree thereof in equivalent units of liquid content in said vessel, means for converting the pressure differential through a fixed head of liquid below the liquid level in the vessel into a pneumatic pressure proportional thereto, and a third bellows operatively controlled by said last-named pneumatic pressure and having a driving connection with said movable fulcrum to vary the proportion between the two arms of the force balance beam by effecting longitudinal movement of said fulcrum with respect to said beam.

8. An apparatus for determining the content of liquid in a vessel which comprises a force balance beam and a fulcrum therefor, a movable bellows cooperating with one arm of the force balance beam for communicating thereto a pneumatic pressure proportional to the static head of the liquid in the vessel, a second bellows for exerting a pneumatic balancing pressure on the other arm of the force balance beam, means for measuring said pneumatic balancing pressure and for exhibiting the degree thereof in equivalent units of liquid content in said vessel, means for converting the pressure differential through a fixed head of liquid below the liquid level in the vessel into a pneumatic pressure proportional thereto, and a third bellows operatively controlled by last-named pneumatic pressure and having a driving connection with said movable bellows to vary the proportion between the two arms of the force balance beam by effecting longitudinal movement of said movable bellows with respect to said beam.

JOSEPH A. PELLETTERE.

REFERENCES CITED

The following references are of record in the file of this patent:

UNITED STATES PATENTS

| Number | Name | Date |
| --- | --- | --- |
| 1,457,406 | Stancliffe | June 5, 1923 |
| 1,992,343 | Ahnstrom | Feb. 26, 1935 |
| 2,072,916 | Willach et al. | Mar. 9, 1937 |